(12) United States Patent
Shahid et al.

(10) Patent No.: US 12,150,210 B2
(45) Date of Patent: *Nov. 19, 2024

(54) UE-CAPABILITY-BASED SYSTEM INFORMATION BLOCK TRANSMISSION (71) Applicant: T-Mobile USA, Inc., Bellevue, WA (US)

(72) Inventors: Wafik Abdel Shahid, Bellevue, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 4 days.

This patent is subject to a terminal disclaimer.

(21) Appl. No.: 18/301,168

(22) Filed: Apr. 14, 2023

(65) Prior Publication Data

US 2023/0262451 A1    Aug. 17, 2023

Related U.S. Application Data (63) Continuation of application No. 17/308,950, filed on May 5, 2021, now Pat. No. 11,659,380.

(51) Int. Cl.
*H04W 8/24* (2009.01)
*H04W 36/08* (2009.01)
(Continued)

(52) U.S. Cl.
CPC ............ *H04W 8/24* (2013.01); *H04W 36/08* (2013.01); *H04W 36/38* (2013.01); *H04W 48/10* (2013.01);
(Continued)

(58) Field of Classification Search
CPC ..... H04W 48/12; H04W 48/16; H04W 48/14; H04W 8/24; H04W 36/08; H04W 36/38; H04W 48/10; H04W 72/1273
See application file for complete search history.

(56) References Cited

U.S. PATENT DOCUMENTS 7,346,353 B2   3/2008 Farnsworth et al.
7,437,178 B2   10/2008 Jeong et al.
(Continued)

FOREIGN PATENT DOCUMENTS

CN    100384262 C    4/2008
CN    101163320 B    4/2010
(Continued)

OTHER PUBLICATIONS

Report of email discussion [AT111-e][009][NR15] LTE SIB extension issue 3GPP TSG-RAN WG2 #111 electronic Aug. 17-28, 2020, 20 pages.
(Continued)

*Primary Examiner* — Nam T Huynh
(74) *Attorney, Agent, or Firm* — Perkins Coie LLP (57) ABSTRACT

A mobile communication network receives capability information from a user equipment (UE) where the capability information indicates a version of the UE which the network uses to determine a 3GPP Release version of the UE. Based on the 3GPP release version, the network determines what type of system information (e.g., System Information Blocks (SIBs)) the UE requires, and transmits the required system information to the UE. Legacy UEs receive only legacy SIBs and non-legacy UEs receive one or more non-legacy SIBs in addition to the legacy SIBs.

18 Claims, 4 Drawing Sheets

(51) Int. Cl.
*H04W 36/38* (2009.01)
*H04W 48/10* (2009.01)
*H04W 48/12* (2009.01)
*H04W 48/14* (2009.01)
*H04W 48/16* (2009.01)
*H04W 72/1273* (2023.01)

(52) U.S. Cl.
CPC ........... *H04W 48/12* (2013.01); *H04W 48/14* (2013.01); *H04W 48/16* (2013.01); *H04W 72/1273* (2013.01)

(56) References Cited

U.S. PATENT DOCUMENTS

| | | | |
|---|---|---|---|
| 7,444,142 | B2 | 10/2008 | Roberts et al. |
| 7,899,448 | B2 | 3/2011 | Muhonen et al. |
| 7,969,924 | B2 | 6/2011 | Young et al. |
| 2020/0404720 | A1 | 12/2020 | Zisimopoulos et al. |
| 2021/0144522 | A1 | 5/2021 | Lee et al. |
| 2021/0258986 | A1* | 8/2021 | Chang .................. H04W 72/30 |

FOREIGN PATENT DOCUMENTS

| | | | |
|---|---|---|---|
| CN | 1836387 | B | 11/2010 |
| CN | 1833380 | B | 12/2010 |
| CN | 101128031 | B | 2/2011 |
| CN | 101212799 | B | 2/2011 |
| CN | 101577909 | B | 3/2011 |
| CN | 101369912 | B | 4/2011 |
| CN | 101557634 | B | 4/2011 |
| CN | 101127960 | B | 5/2011 |
| CN | 113573371 | A * | 10/2021 |
| EP | 1505782 | A2 | 2/2005 |
| EP | 1565020 | B1 | 4/2006 |
| EP | 1553797 | B1 | 5/2007 |
| EP | 1720373 | B1 | 4/2008 |
| EP | 1504625 | B1 | 3/2009 |
| EP | 2276293 | A1 | 1/2011 |
| EP | 2314097 | A1 | 4/2011 |
| JP | 4087857 | B2 | 2/2008 |
| JP | 4272064 | B2 | 3/2009 |
| JP | 2010506445 | A | 2/2010 |
| JP | 2010508761 | A | 3/2010 |
| JP | 4567790 | B2 | 8/2010 |
| JP | 4588431 | B2 | 9/2010 |
| KR | 100483558 | B1 | 4/2005 |
| KR | 20090122982 | A | 12/2009 |

OTHER PUBLICATIONS

Workaround for LTE SIB24 issue MediaTek Inc. 3GPP TSG-RAN WG2 #111-e, Aug. 17-28, 2020, 2 pages.

* cited by examiner

UE-CAPABILITY-BASED SYSTEM INFORMATION BLOCK TRANSMISSION

CROSS-REFERENCE TO RELATED APPLICATIONS

This application is a continuation of U.S. patent application Ser. No. 17/308,950, filed on May 5, 2021, entitled UE-CAPABILITY-BASED SYSTEM INFORMATION BLOCK TRANSMISSION, which is hereby incorporated by reference in its entirety.

BACKGROUND

Master Information Block (MIB) and System Information Blocks (SIBs) contain specific information required for the mobile device or user equipment (UE) to operate in an LTE or 5G NR network. For example, the MIB is the first thing a UE looks for after it completes downlink synchronization. The MIB carries information needed for a UE to acquire other information from the cell. For example, the MIB includes necessary parameters required to decode the first SIB (SIB1). SIB1 carries information needed to evaluate if a UE can access a cell and defines the scheduling of other system information essential for the operation of the UE. For example, SIBs provide the UE with information required to perform cell selection, re-selection, handover, extended access barring (EAB), interworking with WLAN, device-to-device (sidelink) communication, etc. SIBs other than SIB1 are carried in System Information (SI) messages and mapping of SIBs to SI messages is flexibly configurable using a Scheduling Info List included in SIB1.

As the functionality of LTE and NR evolves, new SIBs are added to support new capabilities. For example, 3GPP Release 15 includes SIB24. There is therefore a need for an efficient approach for the network to communicate new SIBs to UEs that require the new SIBs without affecting the operation of legacy UEs (e.g., UEs based on older 3GPP releases) that do not understand the new SIBs.

BRIEF DESCRIPTION OF THE DRAWINGS

Detailed descriptions of implementations of the present invention will be described and explained using the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In one example aspect of the disclosed technology, the network (e.g., radio access network (RAN), or gNB/eNB) receives capability information from a communication device (e.g., a user equipment (UE)) in a mobile communication network (e.g., a cellular LTE or NR network). The capability information indicates a version of the UE. The network maps the version of the UE to a 3GPP release version and determines, based on the 3GPP version, if a system information update is required for the UE. For example, network does this by using a look-up table that maps 3GPP release versions to system information (e.g., System Information Blocks (SIBs)) relevant to the release versions and comparing that with the system information that the UE has already received via initial SIB broadcast, if any. The network then transmits an updated system information (SI) message to the UE in response to determining that that a system information update is required. The update SI message includes one or more non-legacy SIBs.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
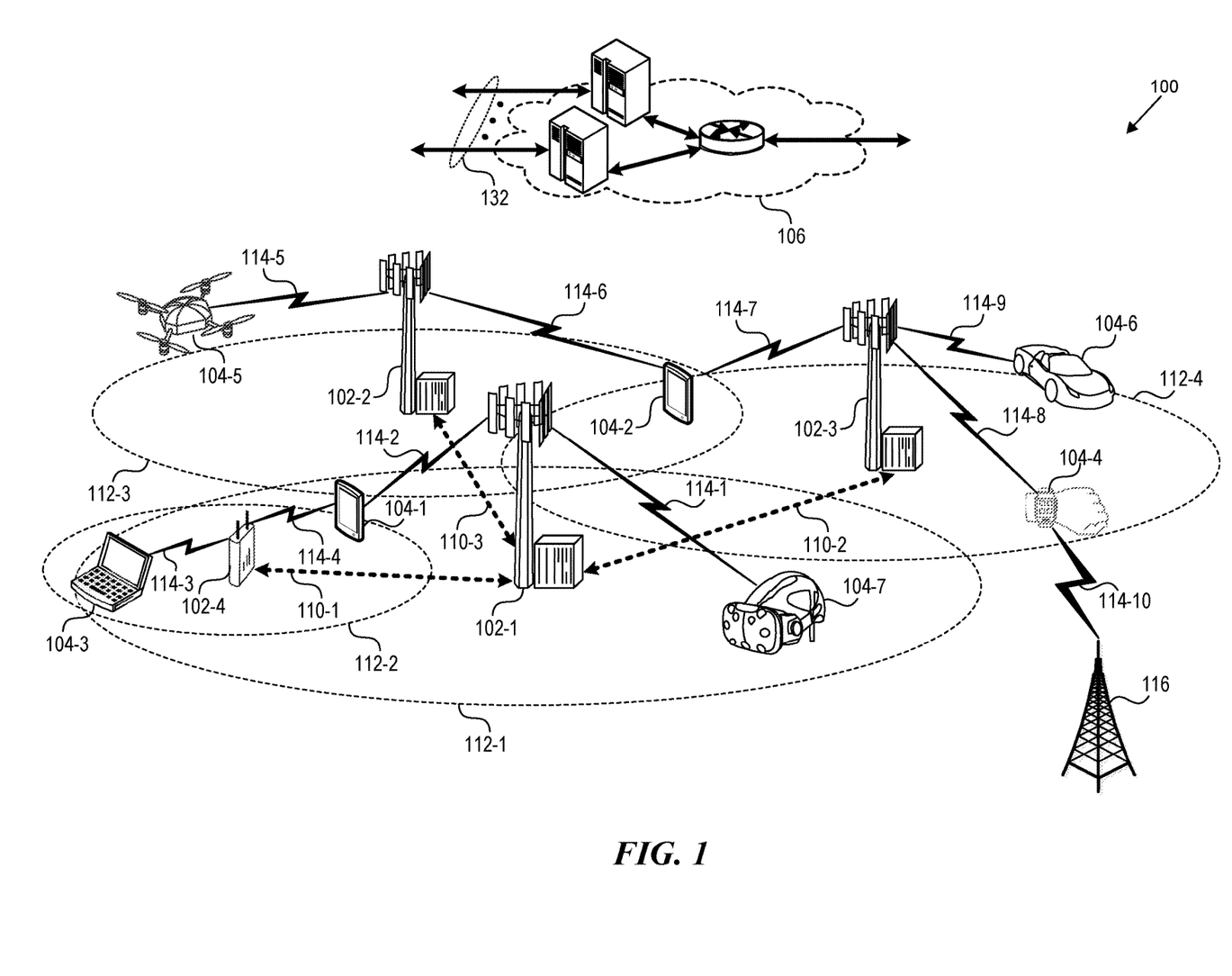
FIG. 1 is a block diagram that illustrates a wireless communications system.

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 100 also include wireless devices 104-1 through 104-8 (referred to individually as "wireless device 104" or collectively as "wireless devices 104") and a core network 106. The wireless devices 104-1 through 104-8 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over an LTE/LTE-A communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)), etc.

The system 100 can include a 5G network and/or an LTE/LTE-A or other network. In an LTE/LTE-A network, the term eNB is used to describe the base stations 102 and in 5G new radio (NR) networks, the term gNBs is used to describe the base stations 102 that can include mmW communications. The system 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some implementations, the communication links 114 include LTE and/or mmW communication links.

In some implementations of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Capability-Based SIB Transmission

As the functionality of LTE and NR evolves, new SIBs are added to support new capabilities. The new SIBs provide useful information to new UEs (i.e., UEs compatible with later 3GPP releases), for example, information necessary for mobility, Idle mode Reselection, RAN cell configuration changes, etc. For example, 3GPP Release 15 introduced SIB24 which provides cell reselection information allowing a UE to move from a Long-Term Evolution (LTE) Radio Access Technology (RAT) to New Radio (NR) RAT while in RRC Idle mode. SIB24 allows a Standalone (SA) NR UE to roam into LTE and reselect back to NR allowing it to utilize 5G whenever possible. SIB24 is therefore only relevant to UEs that support both LTE and NR operation. However, some legacy UEs (e.g., UEs based on Release 14 and earlier that support only LTE but not NR) could attempt to read new SIBs such as SIB24 instead of ignoring such SIBs. Additionally, or alternatively, some legacy UEs may be unable to correctly decode SIB1 scheduling information, for example, where the legacy UE is unable to correctly decode a SIB-Type information element (IE) that includes extension markers or ellipses (" . . . ") separating legacy SIBs and new SIBs. These legacy UEs could fail to connect to the network if able to read the new SIBs or if the UEs ignore the entire SIB1 when the cell is broadcasting the new SIBs (i.e., when the cell is broadcasting SIBs occurring after the extension marker, e.g., when broadcasting SIB19 and onwards). The legacy UEs could try to decode information in SIB1 or decode the new SIBs thereby corrupting the UE and leading to failure (e.g., the cell can erroneously be considered as barred or the UEs can crash or their functionality can become otherwise anomalous). This can require the network operator to temporarily disable broadcast of the affected SIB (or disable scheduling, in SIB1, of affected SIBs) or require time consuming upgrades of various affected UEs.

The disclosed technology provides a network-based solution to identify a UE's 3GPP release and/or the UE's capability and appropriately target on-demand SIB messages to newer UEs that can understand newer SIBs while transmitting only legacy SIBs to older UEs that cannot understand the newer SIBs (e.g., using new layer 3 messaging to target legacy UEs, such as LTE UEs, with on-demand SIB messages providing the UEs only the SIBs they need). That is, the disclosed technology ensures that UEs are provided with only the system information or SIBs that they need and can act upon and no more. This makes LTE, non-standalone (NSA) NR, and standalone (SA) NR modes coexistence more robust.

Figure 2:
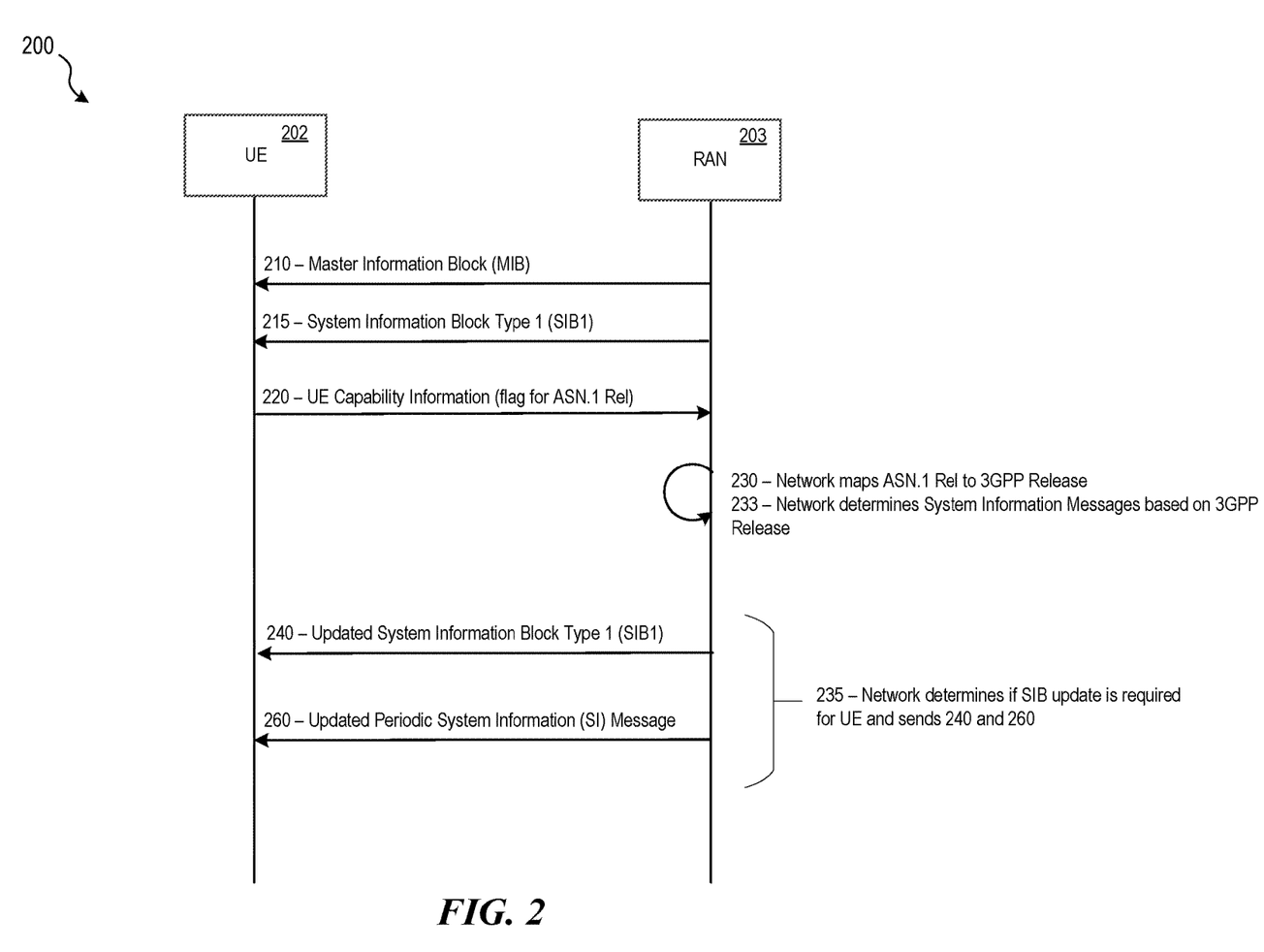
FIG. 2 is a flow diagram that illustrates a process for modifying a System Information Block (SIB) messages based on UE capability.

FIG. 2 is a flow diagram that illustrates a process 200 for modifying System Information Block (SIB) messages based on UE capability. At 210, the radio access network (RAN) 203, e.g., the LTE eNB or NR gNB sends a Master Information Block (MIB) message 210, to the UE 202. The MIB 210 is sent to the UE over a broadcast transport channel (BCH) and a physical broadcast physical channel (PBCH). The MIB 210 provides the UE with parameters that the UE needs to acquire the first System Information Block (SIB), i.e., SIB type 1 (SIB1). For example, the MIB 210 includes information required for the UE to monitor the Physical Downlink Control Channel (PDCCH) for scheduling of the Physical Downlink Shared Channel (PDSCH) that carries SIB1.

The RAN 203 also sends to the UE a SIB Type 1 (SIB1) message 215. The SIB1 215 carries information required by the UE to access the cell. For example, SIB1 215 includes random access parameters, PLMN list, tracking area codes, UE's timers and constants, access control information, etc. SIB1 215 also includes information regarding the availability and scheduling of other SIBs, e.g., the mapping of SIBs to system information (SI) message, periodicity of the SI messages, SI-window size, etc. As disclosed herein, instead of the LTE or NR RAN (e.g., LTE eNB and NR gNB) scheduling all the SIBs available for the RAN (e.g., for a 3GPP Release 15 RAN, scheduling up to SIB24), SIB1 215 only schedules the legacy SIBs (i.e., SIBs known not to cause problems with older UEs, e.g., SIB2 to SIB18 or SIB2 to SIB9, or SIBs preceding the extension marker in SIB-Type IE). As a result, legacy/older UEs have no opportunity to try and decode or read newer SIBs that they do not need or understand and that could result in the UE crashing or UE being considered as barred from the cell.

At 220, the UE 202 sends its Capability Information to the RAN 203 (e.g., via Radio Resource Control (RRC) messages). In some implementations, the UE sends the Capability Information in response to a Capability Enquiry message from the network. The UE Capability Information is contained in an Abstract Syntax Notation One (ASN.1) data structure defining "release" information that informs the network of the release or version of the UE (e.g., includes a flag for UE release).

At 230 the network maps the ASN.1 Release information received from the UE to a 3GPP Release version. Knowing the 3GPP Release version allows the network, at 233, to determine if the SI messages scheduled in SIB1 215 suffices for the UE, or if the UE requires additional SIBs. For example, if the Capability Information indicates that the UE is a Release 15 UE capable of operating in an LTE and NR RAT, the network can determine that the UE would need SIB24 which provides information that would allow the UE to roam from LTE to NR.

At 235, the network determines if a SIB update is required for UE 202 based on the UE Capability Information received at 220. In some implementations, determining if a SIB update is required comprises comparing the 3GPP release determined at 233 with a look-up table or other data stored in a memory in the UE or in the network that indicates what SIBs are relevant to what 3GPP releases (e.g., querying the memory with the 3GPP release version and receiving a list of SIBs relevant to the 3GPP release in response to the query). For example, the lookup table or memory can store information indicating that if UE's release is Release 15, SIB24 would be required because SIB24 provides cell reselection information allowing a UE to move from LTE to NR. If a SIB update is required, the network sends an updated SIB1 and updated SI message at 240 and 260 (or in some implementations, the network schedules the required SI messages directly).

At 240, the RAN 203 sends to the UE 202 an updated SIB1 240 with an updated SIB mapping information that is determined based on the UE Capability Information (e.g., an updated SIB1 format bitmap that is based the UE's 3GPP Release). SIB1 240 schedules SI messages pertinent for the UE based on the UE Capability Information, and sends the Updated Periodic SI messages to the UE at 260 based on the updated SIB1 240 scheduling information. That is, the updated SIB1 240 schedules the transmission of non-legacy SIBs to UEs that are determined to be capable of acting on the non-legacy SIBs based on the received Capability Information (i.e., legacy UEs receive only legacy SIBs but non-legacy or newer UEs can receive both the legacy SIBs and one or more non-legacy SIBs). For example, the network could determine that a 3GPP Release 15 UE needs to receive scheduling information for SIB24. The network would then include SIB24 scheduling information in the updated SIB1 240 and send SIB24 in the Updated Periodic SI Message 260. On the other hand, the network could determine that a 3GPP Release 8 UE does not need SIB24 and thus would not include scheduling information for SIB24 in the updated SIB1 message 240.

To ensure that legacy UEs do not get an opportunity to read SIBs that are not intended for their release, the UEs can be targeted directly and individually with layer 3 messaging (e.g., Radio Resource Control (RRC) layer messaging) carrying information on SIBs relevant to the UE (relevance being determined by the UEs' capability information). This unicast message can use the Physical Downlink Control Channel (PDCCH) with SIB-updates based on a C-RNTI (cell radio network temporary identifier) instead of using broadcast system update messages which would be decodable by all legacy UEs (e.g., PDCCH scrambled with system information RNTI (SI-RNTI)).

In some implementations, the updated SIB1 240 and the updated SI messages 260 can be unicast on a downlink shared channel (DL-SCH). Additionally, or alternatively, the SI messages 260 can be broadcast on-demand or periodically broadcast on DL-SCH based on the network's determination at 235 on what SI messages the UEs' need based on the UEs' capability information received at 220.

The UE 202 acquires system information using process 200 in various situations including on cell selection (e.g., after power on), on cell reselection (e.g., when roaming), when the UE returns from out of coverage, after reconfiguration with synchronization completion, after switching Radio Access Technologies (RATs), upon receiving an indication that the SI has changed, upon receiving a Public Warning System (PWS) notification, whenever the UE does not have a valid version of a stored SIB, etc.

Figure 3:
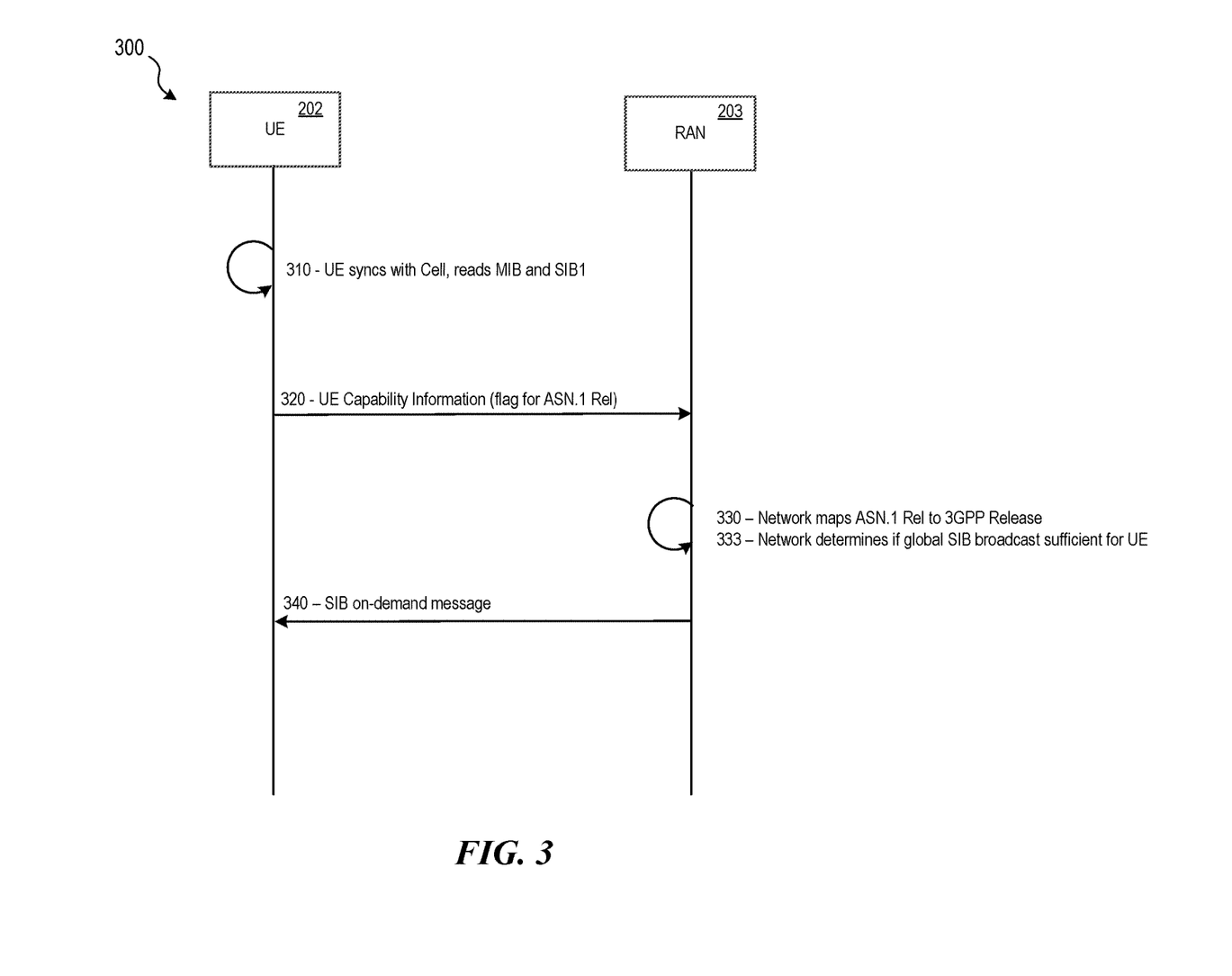
FIG. 3 is a flow diagram that illustrates a process for sending on-demand system information messages based on UE capability.

FIG. 3 is a flow diagram that illustrates a process 300 for sending on-demand system information messages based on UE capability. At 310, the UE 202 synchronizes with a cell and reads the Master Information Block (MIB) and System Information Block Type 1 (SIB1), collectively, minimum system information (SI). For example, UE 202 can read MIB message 210 and SIB1 message 215 shown in process 200 of FIG. 2.

At 320, UE 202 sends its Capability Information to the RAN 203 (e.g., via RRC messages). In some implementations, the UE sends the Capability Information in response to a Capability Enquiry message from the network. The UE Capability Information includes a flag for ASN.1 Release that informs the network of the release or version of the UE.

At 330 the network maps the ASN.1 Release information received from the UE to a 3GPP Release version. At 333, the network determines based on the 3GPP Release version if the global SIBs broadcast to the UE suffice for the UE. That is, at 333 the network determines if the SIBs broadcasts based on scheduling information in SIB1 that the UE reads at 310 include all the SIBs that the UE needs based on the UE Capability Information or if the UE needs additional SIBs that are not already scheduled in SIB1 to be broadcast to the UE.

At 340, the networks initiates SIB on demand messages targeted to the UE to resolve the contention between the SIBs that are already being broadcast to the UE and the SIBs that the UE needs based on the UE's 3GPP release (i.e., based on the UE capability information received at 320). In some implementations, the SIB on-demand message 340 includes SI messages sent to the UE 202 without a corresponding request (e.g., without a System Information Request from the UE to the RAN 203 (eNB/gNB)). This is because, the RAN already knows what SI messages the UE needs based on the UE capability information sent at 320. As a result, the RAN 203 can send non-legacy SIBs to the UE 202 in a dedicated manner (e.g., on DL-SCH).

In some implementations, the SIB on-demand message 340 includes unicasting SIB1 on DL-SCH where the SIB1 indicates that non-legacy SIBs (e.g., newer SIBs introduced in current 3GPP release or in later 3GPP releases) are only provided on-demand. In this implementation, the SIB can also provide a physical random access channel (PRACH) configuration that UE 202 can use to request one or more non-legacy SIBs from the RAN 203 (i.e., from the network or eNB/gNB).

Computer System

Figure 4:
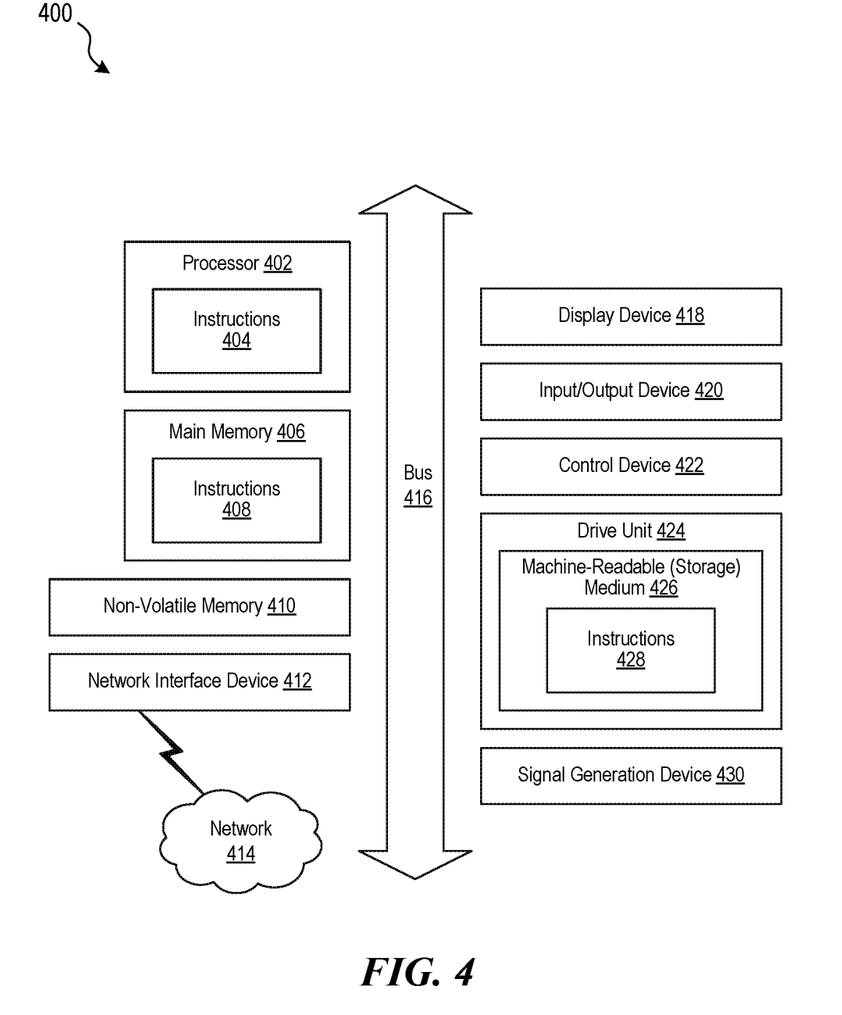
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that can store, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Some portions of the disclosure can be presented in terms of algorithms and symbolic representations of operations on data bits within a computer memory. These algorithmic descriptions and representations are the means used by those skilled in the data processing arts to most effectively convey the substance of their work to others skilled in the art. An algorithm can refer to a sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems can be used with programs in accordance with the described teachings, or it can prove convenient to construct more specialized apparatus to perform the methods of some implementations. The required structure for a variety of these systems will appear from the description. In addition, the techniques are not described with reference to any particular programming language, and various implementations can thus be implemented using a variety of programming languages.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be ssbcaid in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. At least one computer-readable storage medium, excluding transitory signals and carrying instructions, which, when executed by at least one data processor of a server system in a cellular wireless telecommunications network, cause the system to:
   receive capability information from a user equipment (UE) in the wireless telecommunications network, wherein the capability information indicates a version of the UE;
   map the version of the UE to a 3rd Generation Partnership Project (3GPP) Release version;
   determine, based on the 3GPP Release version, that a system information update is required for the UE; and,
   transmit an updated system information (SI) message to the UE in response to determining that that the system information update is required,
      wherein the updated SI message comprises one or more non-legacy System Information Blocks (SIBs),
      wherein to transmit the updated SI message to the UE comprises transmitting the updated SI message on demand on a downlink shared channel (DL-SCH), and
      wherein the updated SI message is transmitted to the UE without a request from the UE corresponding to the updated SI message.

2. The at least one computer-readable storage medium of claim 1, wherein transmitting an updated SI message to the UE comprises transmitting an updated System Information Block Type 1 (SIB1) message to the UE wherein the SIB1 message comprises scheduling information to schedule the one or more non-legacy SIBs for transmission to the UE.

3. The at least one computer-readable storage medium of claim 1, wherein determining, based on the 3GPP Release version, that the system information update is required comprises querying a memory with the 3GPP release version and receiving, in response to the querying, a list of SIBs relevant to the 3GPP release.

4. The at least one computer-readable storage medium of claim 1, wherein the capability information is contained in an Abstract Syntax Notation One (ASN.1) data structure.

5. The at least one computer-readable storage medium of claim 1, wherein the one or more non-legacy SIBs comprises a System Information Block Type 24 (SIB24).

6. The at least one computer-readable storage medium of claim 1, wherein the one or more non-legacy SIBs comprises one or more SIBs occurring after an extension marker in a SIB-Type information element.

7. The at least one computer-readable storage medium of claim 1, wherein the one or more non-legacy SIBs comprises a cell reselection information, wherein the cell reselection information allows the UE to move from a Long-Term Evolution (LTE) Radio Access Technology (RAT) to New Radio (NR) RAT.

8. The at least one computer-readable storage medium of claim 1, wherein transmitting the updated SI message to the UE comprises unicasting the SI message on the DL-SCH.

9. The at least one computer-readable storage medium of claim 1, wherein transmitting an updated system information message to the UE comprises transmitting a System Information Block Type 1 (SIB1) message to the UE, wherein the SIB1 message comprises information indicating that one or more non-legacy SIBs are only provided on demand to the UE.

10. The at least one computer-readable storage medium of claim 9, wherein the SIB1 message further comprises a physical random access channel (PRACH) configuration information useable by the UE to request the one or more non-legacy SIBs.

11. A system comprising:
   at least one hardware processor; and at least one non-transitory memory, coupled to the at least one hardware processor and storing instructions, which, when executed by the at least one hardware processor, cause the system to:
    receive capability information from a user equipment (UE) in a mobile communication network,
        wherein the capability information indicates a version of the UE;
    map the version of the UE to a 3rd Generation Partnership Project (3GPP) Release version;
    determine, based on the 3GPP Release version, that a system information update is required for the UE; and,
    transmit an updated system information (SI) message to the UE in response to determining that that a system information update is required,
        wherein the updated SI message comprises one or more non-legacy System Information Blocks (SIBs),
        wherein to transmit the updated SI message to the UE comprises transmitting the updated SI message on demand on a downlink shared channel (DL-SCH), and
        wherein the updated SI message is transmitted to the UE without a request from the UE corresponding to the updated SI message.

12. The system of claim 11, wherein determining, based on the 3GPP Release version, that a system information update is required comprises querying a memory with the 3GPP release version and receiving, in response to the querying, a list of SIBs relevant to the 3GPP release.

13. The system of claim 11, wherein the one or more non-legacy SIBs comprises one or more SIBs occurring after an extension marker in a SIB-Type information element.

14. The system of claim 11, wherein transmitting an updated SI message to the UE comprises transmitting a System Information Block Type 1 (SIB1) message to the UE, wherein the SIB1 message comprises information indicating that one or more non-legacy SIBs are only provided on demand to the UE.

15. A method comprising:
    receiving capability information from a user equipment (UE) in a mobile communication network,
        wherein the capability information indicates a version of the UE;
    mapping the version of the UE to a 3rd Generation Partnership Project (3GPP) Release version;
    determining, based on the 3GPP Release version, that a system information update is required for the UE; and,
    transmitting an updated system information (SI) message to the UE in response to determining that that a system information update is required,
        wherein the updated SI message comprises one or more non-legacy System Information Blocks (SIBs),
        wherein transmitting the updated SI message to the UE comprises transmitting the updated SI message on demand on a downlink shared channel (DL-SCH), and
        wherein the updated SI message is transmitted to the UE without a request from the UE corresponding to the updated SI message.

16. The method of claim 15, wherein determining, based on the 3GPP Release version, that a system information update is required comprises querying a memory with the 3GPP release version and receiving, in response to the querying, a list of SIBs relevant to the 3GPP release.

17. The method of claim 15, wherein the one or more non-legacy SIBs comprises one or more SIBs occurring after an extension marker in a SIB-Type information element.

18. The method of claim 15, wherein transmitting an updated SI message to the UE comprises transmitting a System Information Block Type 1 (SIB1) message to the UE, wherein the SIB1 message comprises information indicating that one or more non-legacy SIBs are only provided on demand to the UE.

\* \* \* \* \*